US012749510B2

(12) United States Patent
Kosugi

(10) Patent No.: US 12,749,510 B2
(45) Date of Patent: Sep. 29, 2026

(54) INFORMATION PROCESSING APPARATUS, STORAGE MEDIUM, AND INFORMATION PROCESSING SYSTEM

(71) Applicant: CANON KABUSHIKI KAISHA, Tokyo (JP)

(72) Inventor: Naoya Kosugi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 137 days.

(21) Appl. No.: 18/815,373

(22) Filed: Aug. 26, 2024

(65) Prior Publication Data

US 2025/0078876 A1 Mar. 6, 2025

(30) Foreign Application Priority Data

Aug. 28, 2023 (JP) ................................ 2023-138004

(51) Int. Cl.
*G11B 27/34* (2006.01)
*G11B 27/031* (2006.01)

(52) U.S. Cl.
CPC ............ *G11B 27/34* (2013.01); *G11B 27/031* (2013.01)

(58) Field of Classification Search
CPC .............................. G11B 27/01; G11B 27/034
See application file for complete search history.

(56) References Cited

U.S. PATENT DOCUMENTS 9,361,521 B1 * 6/2016 McLean .............. G06F 3/04847
10,248,866 B1 * 4/2019 Cotoros ................ G06V 40/19
10,356,456 B2 * 7/2019 Ranjeet ................ G11B 27/031
10,664,687 B2 * 5/2020 Suri ........................ G06V 20/40
2008/0298767 A1 * 12/2008 Jeong ........................ H04N 5/91 386/296
2014/0033036 A1 * 1/2014 Gaur .................. H04N 21/4756 715/719
2016/0104045 A1 * 4/2016 Cho .................. H04N 21/4394 386/223
2016/0105708 A1 * 4/2016 Packard ........... H04N 21/25841 725/10
2016/0247328 A1 * 8/2016 Han .................. H04N 21/8549
(Continued)

FOREIGN PATENT DOCUMENTS

CN 101431689 B * 1/2012
JP 2014187687 A 10/2014

*Primary Examiner* — Gelek W Topgyal
(74) *Attorney, Agent, or Firm* — Canon U.S.A., Inc. IP Division

(57) ABSTRACT

An information processing apparatus capable of communicating with an electronic device includes one or more memories, and one or more processors in communication with the one or more memories, wherein the one or more processors and the one or more memories are configured to determine a video highlight scene and an audio highlight scene, obtain information about a time period of each of the video highlight scene and the audio highlight scene, receive priority information from the electronic device, the priority information indicating whether either the video highlight scene or the audio highlight scene or both are to be prioritized, determine a time period of a highlight moving image based on the priority information and information about the time period of each of the video highlight scene and the audio highlight scene, and provide a notification of the time period of the highlight moving image to the electronic device.

14 Claims, 10 Drawing Sheets

(56) References Cited

U.S. PATENT DOCUMENTS

| | | | | |
|---|---|---|---|---|
| 2020/0372066 | A1* | 11/2020 | Saggi | G06N 3/09 |
| 2025/0039336 | A1* | 1/2025 | Lee | H04N 7/155 |
| 2025/0097512 | A1* | 3/2025 | Lal | H04N 21/8455 |
| 2025/0258864 | A1* | 8/2025 | Park | G06V 20/41 |

* cited by examiner

INFORMATION PROCESSING APPARATUS, STORAGE MEDIUM, AND INFORMATION PROCESSING SYSTEM

BACKGROUND OF THE DISCLOSURE

Field of the Disclosure

The present disclosure relates to an information processing apparatus, a storage medium, and an information processing system.

Description of the Related Art

In determination of highlight scenes, some typical highlight scene extraction devices combine scene composition features extracted from a moving image and audio features extracted from audio information that has been separated from the moving image, thus extracting highlight scenes from the moving image with enhanced accuracy, as discussed in Japanese Patent Application Laid-Open No. 2014-187687.

Assume that highlight scene extraction is attempted by using audio features extracted from audio information in addition to scene composition features of frame images of video data, as in a typical technique. In such a case, frame images having no scene composition feature are not even subjected to determination as to whether the frame images qualify as a highlight scene even if the audio features of the frame images satisfy predetermined conditions. For example, even if music reaches climax and audio features satisfy predetermined conditions, as in a moving image obtained by imaging a concert of an orchestra or the like, with a stage darkened or faces of many performers appearing in a small size, the scene composition features do not satisfy the predetermined conditions in some cases. Frame images in such cases are not selected as a highlight scene.

Even if audio features and scene composition features both satisfy predetermined conditions and are extracted as a highlight scene, portions that satisfy the predetermined conditions for each of audio features and scene composition features may be mixed up in terms of the order of events depending on a scene. In such a case, an unnatural moving image, such as one including a highlight scene that starts and/or ends in the middle of a voice conversation, is presumably generated.

SUMMARY OF THE DISCLOSURE

Thus, the present disclosure is directed to generating an appropriate highlight moving image suitable for details of content by either a video highlight scene or an audio highlight scene or both being prioritized in accordance with the details of the content.

According to an aspect of the present disclosure, an information processing apparatus capable of communicating with an electronic device includes one or more memories, and one or more processors in communication with the one or more memories, wherein the one or more processors and the one or more memories are configured to determine a video highlight scene based on a feature of video data included in a moving image file, and determine an audio highlight scene based on a feature of audio data included in the moving image file, obtain information about a time period of each of the video highlight scene and the audio highlight scene, receive priority information from the electronic device, the priority information indicating whether either the video highlight scene or the audio highlight scene or both are to be prioritized, determine a time period of a highlight moving image based on the priority information and information about the time period of each of the video highlight scene and the audio highlight scene, and provide a notification of the time period of the highlight moving image to the electronic device.

Further features of the present disclosure will become apparent from the following description of exemplary embodiments with reference to the attached drawings.

DESCRIPTION OF THE EMBODIMENTS

Figure 1:
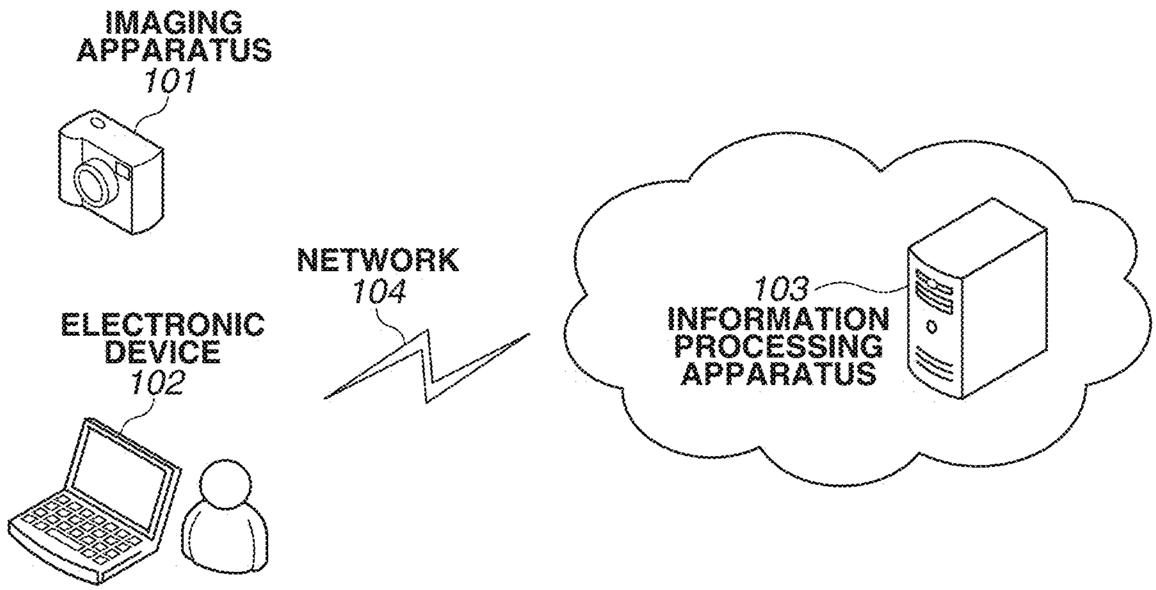
FIG. 1 is a diagram illustrating an overall system configuration according to an exemplary embodiment.

Hereinafter, suitable exemplary embodiments of the present disclosure will be described in detail with reference to the accompanying drawings.

In the present specification and drawings, components having substantially the same functional configuration are denoted by the same reference numerals, and redundant description thereof will be omitted.

Exemplary embodiments are directed to a case where a moving image file generated by an imaging apparatus is uploaded onto a cloud service, and an information processing apparatus that is on the cloud service and includes the system according to the present disclosure performs data processing. The term “user” used herein refers to anyone who uses the system of the present disclosure.

FIG. 1 is a diagram illustrating an overall system configuration according to an exemplary embodiment. The system according to the present exemplary embodiment includes an imaging apparatus 101, an electronic device 102, and an information processing apparatus 103.

The imaging apparatus 101 is used to generate a moving image file to be processed by the information processing apparatus 103 described below. The moving image file used in the present exemplary embodiment is not limited to specific formats or codecs.

The electronic device 102 is a terminal device of a user who uses the system according to the present disclosure, and is also used as a medium for obtaining information provided from the information processing apparatus 103 described below.

The information processing apparatus 103 performs data processing for providing information about the time period of a highlight scene (described below) on a moving image file generated and uploaded by the imaging apparatus 101, and provides the information about the time period of the highlight scene (described below) to the electronic device 102.

A moving image file generated by the imaging apparatus 101 is uploaded from the user's local environment to the information processing apparatus 103 via a network 104. The network 104 may be either wireless communication or wired communication depending on the form of the network 104.

In the system of the present disclosure, means for transmitting a moving image file to the information processing apparatus 103 is not limited to a specific form, and means other than communication via the network 104 may be used. In the present exemplary embodiment, a moving image file may be uploaded from the imaging apparatus 101 directly to the information processing apparatus 103, or may be uploaded from the imaging apparatus 101 to the information processing apparatus 103 via the electronic device 102.

The information processing apparatus 103 described herein may take the form of a server or an apparatus having functionality similar to those of servers. A server that has integrated functions of servers may be used.

In the present exemplary embodiment, the electronic device 102 is described as an example of a data output destination from the information processing apparatus 103, but the data output destination is not limited thereto depending on the format of data to be output. In a case where a server or other devices of another system is connected as an output destination from the information processing apparatus 103, it is not necessary to output data to be displayed in a text file format and/or on a user interface (UI), and data may be output in accordance with a format of a database or the like.

In the present exemplary embodiment, a moving image file is uploaded from the imaging apparatus 101 or the electronic device 102 onto the cloud service, and processing is performed on the cloud service including the system according to the present disclosure. Such an exemplary embodiment is not restrictive, and the inclusion of the system of the present disclosure in the electronic device 102 is also conceivable.

Figure 2:
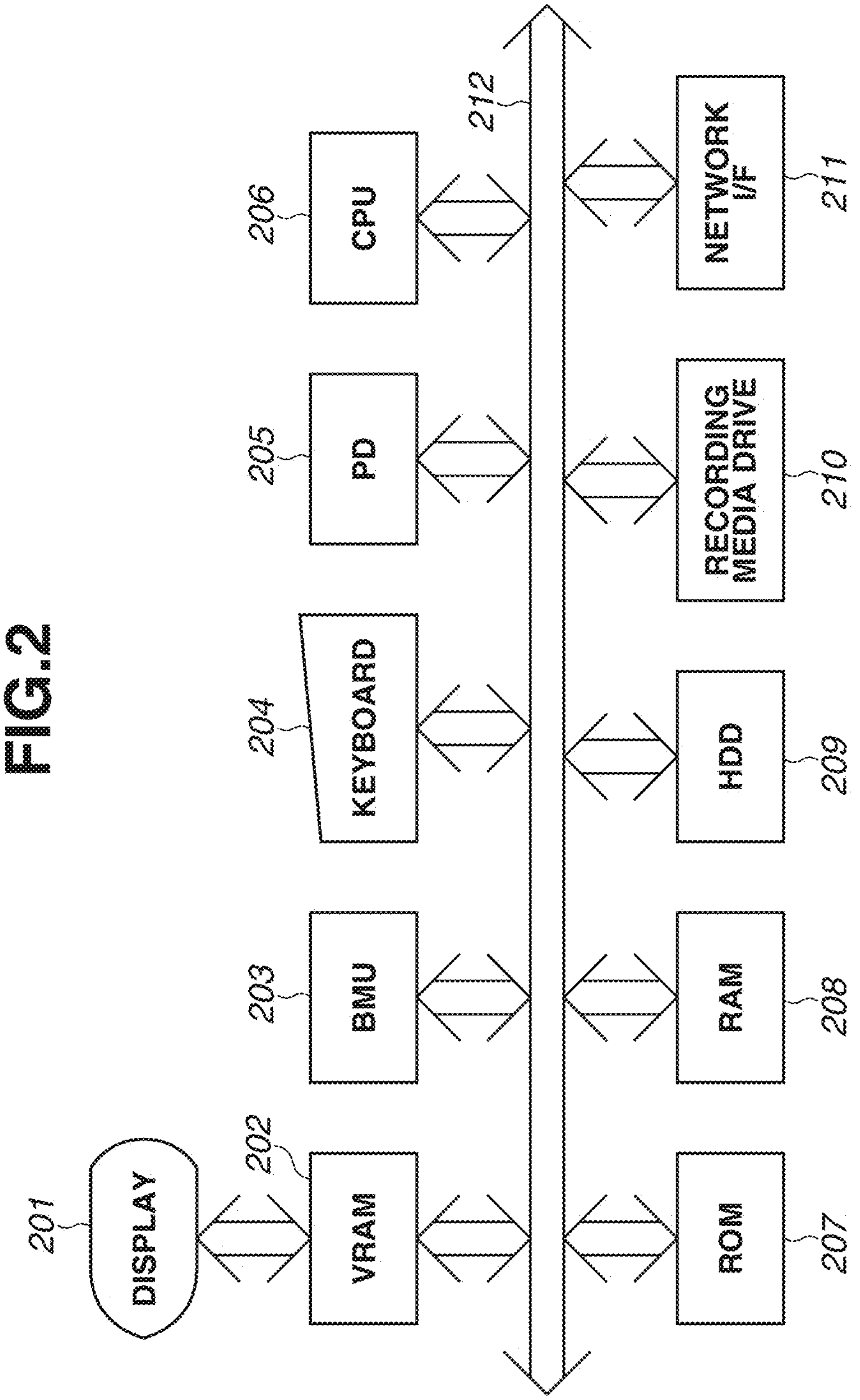
FIG. 2 is a block diagram illustrating a configuration of an electronic device or an information processing apparatus according to the exemplary embodiment.

FIG. 2 is a block diagram illustrating a configuration of the electronic device 102 or the information processing apparatus 103 according to the present exemplary embodiment.

As illustrated in FIG. 2, the electronic device 102 and the information processing apparatus 103 have a similar configuration.

The electronic device 102 and the information processing apparatus 103 include a display 201, a video random access memory (VRAM) 202, and a bit move unit (BMU) 203.

The electronic device 102 and the information processing apparatus 103 further include a keyboard 204, a pointing device (PD) 205, a central processing unit (CPU) 206, and a read only memory (ROM) 207.

The electronic device 102 and the information processing apparatus 103 yet further include a random access memory (RAM) 208, a hard disk drive (HDD) 209, a recording media drive 210, a network interface (I/F) 211, and a bus 212.

The display 201 displays, for example, icons, messages, menus, and other UI information which are used for managing the electronic device 102.

An image to be displayed on the display 201 is rendered in the VRAM 202. The generated image data in the VRAM 202 is transferred to the display 201 in accordance with predetermined specifications, so that an image is displayed on the display 201.

The BMU 203 controls, for example, data transfer between memories (e.g., between the VRAM 202 and another memory) and data transfer between a memory and an input and output (I/O) device (e.g., the network I/F 211).

The keyboard 204 includes various keys for inputting characters and the like. The PD 205 is used for, for example, pointing at an icon, a menu, or other items displayed on the display 201 and dragging and dropping an object.

The CPU 206 controls each device based on control programs such as an operating system (OS) or programs (described below) stored in the ROM 207, the HDD 209, or the recording media drive 210.

The ROM 207 stores various control programs and data. The RAM 208 includes a work area for the CPU 206, a data save area for error processing, and a control program load area.

The HDD 209 stores data, such as control programs to be executed in the electronic device 102 and temporarily stored data.

The network I/F 211 communicates with another electronic device 102, a printer, and other devices via a network.

The bus 212 includes an address bus, a data bus, and a control bus.

Control programs are providable to the CPU 206 also from the ROM 207, the HDD 209, or the recording media drive 210, and are providable also from other servers and the like via the network I/F 211 over a network.

Figure 3:
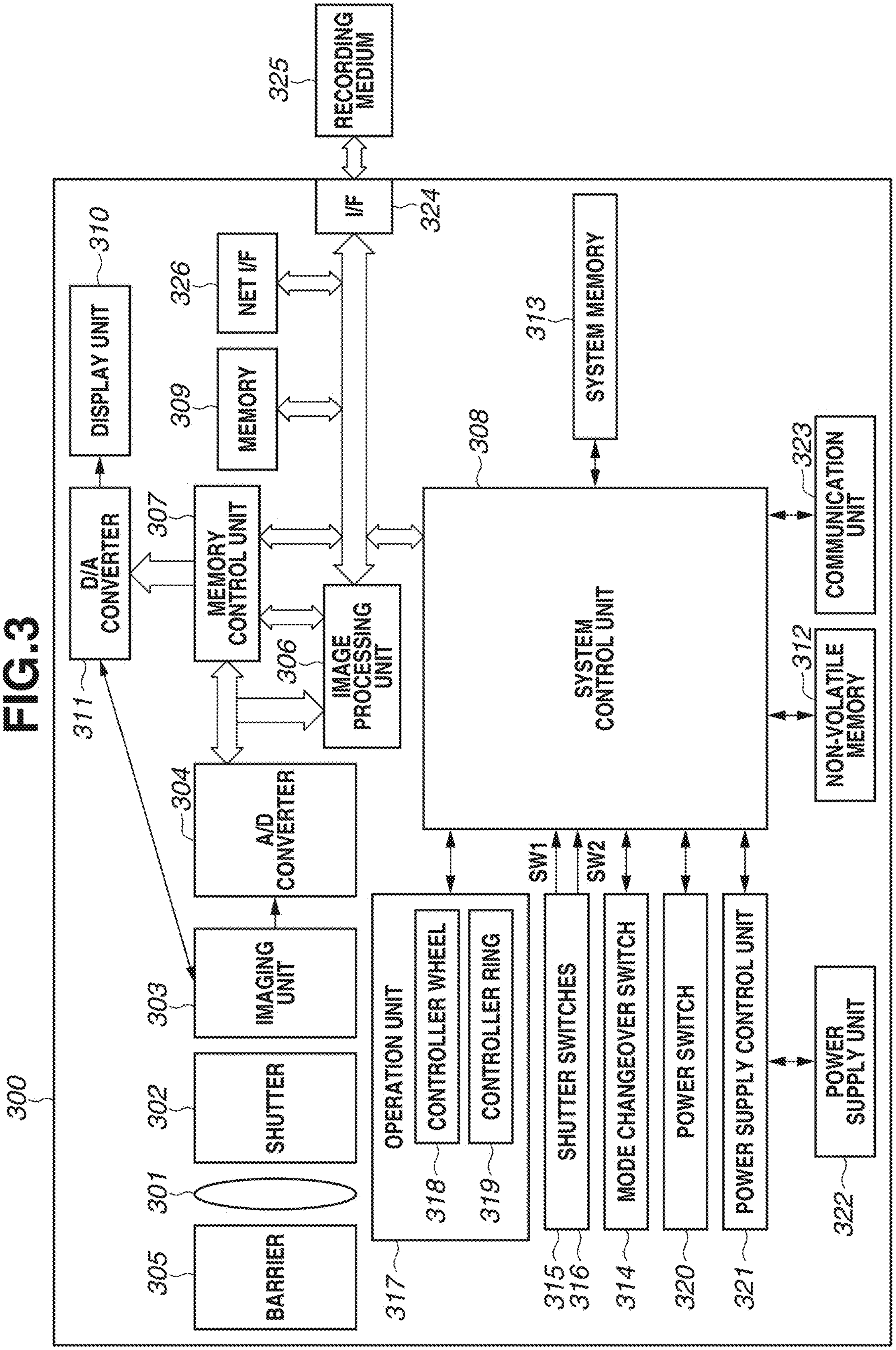
FIG. 3 is a block diagram illustrating a configuration of an imaging apparatus according to the exemplary embodiment.

FIG. 3 is a block diagram illustrating a configuration of an imaging apparatus 101 according to the present exemplary embodiment. The imaging apparatus 101 is, for example, a terminal, such as a digital camera 300 having an imaging function.

An imaging lens 301 includes a zoom lens and a focus lens. A shutter 302 has an aperture control function. An imaging unit 303 includes a Charge Coupled Device (CCD) sensor or a Complementary Metal-Oxide-Semiconductor (CMOS) element each of which converts an optical image into electric signals.

An analog-to-digital (A/D) converter 304 converts analog image data input from the imaging unit 303 into digital image data. A barrier 305 covers the imaging lens 301 and other elements to prevent soiling and damage on an imaging system including the imaging lens 301, the shutter 302, and the imaging unit 303.

An image processing unit 306 performs image processing on digital image data from the A/D converter 304 or on digital image data from a memory control unit 307, and outputs the processed data as digital image data. Examples of the image processing include color conversion processing, such as predetermined pixel interpolation, and resizing processing, such as reduction. The digital image data is subjected to compression encoding processing in accordance with a compression encoding standard, such as the Joint Photographic Experts Group (JPEG) standard or the Motion Picture Experts Group (MPEG) standard, and is stored in various image file formats, so that an image file is generated. The generated moving image file includes video data and audio data.

The image processing unit 306 performs predetermined arithmetic processing using captured image data, and a system control unit 308 performs exposure control and ranging control based on an arithmetic result. A memory 309 temporarily records digital image data output from the A/D converter 304 via the image processing unit 306 and the memory control unit 307 or via only the memory control unit 307.

The system control unit 308 controls the entire imaging apparatus 101. The system control unit 308 executes a program stored in a non-volatile memory 312 to implement processing of the imaging apparatus 101.

The memory 309 temporarily records digital image data output from the A/D converter 304 and image data to be displayed on a display unit 310. The memory 309 has a storage capacity sufficient to store a predetermined number of still images and moving images and audio for a predetermined time period. The memory 309 also serves as a memory for image display (video memory).

A digital-to-analog (D/A) converter 311 converts image data for image display stored in the memory 309 into analog signals and supplies the analog signals to the display unit 310. Thus, the display unit 310 displays, via the D/A converter 311, the image data for display temporarily stored in the memory 309. The display unit 310 performs display on a display device, such as a liquid crystal display (LCD), in accordance with the analog signals output from the D/A converter 311.

The non-volatile memory 312 is an electrically erasable and recordable memory, and for example, an electrically erasable programmable read-only memory (EEPROM) is used. The non-volatile memory 312 stores constants for operation of the system control unit 308, control programs such as programs for cooperation described below, and the like.

A system memory 313 is, for example, a RAM, and expands constants and variables for operation of the system control unit 308, a program read from the non-volatile memory 312, and the like.

A mode changeover switch 314, a first shutter switch 315, a second shutter switch 316, and an operation unit 317 are operation means for inputting various operation instructions to the system control unit 308. The mode changeover switch 314 changes the operation mode of the system control unit 308 to any one of a still image recording mode, a moving image recording mode, a playback mode, and other modes.

The first shutter switch 315 is turned on during an operation on a shutter button of the imaging apparatus 101, in other words, with a half-press (such an operation corresponds to an imaging preparation instruction), and generates a first shutter switch signal SW1.

The second shutter switch 316 is turned on with completion of the operation on the shutter button, in other words, with a full-press (such an operation corresponds to an imaging instruction), and generates a second shutter switch signal SW2. The system control unit 308 starts a series of imaging processing operations including reading of signals from the imaging unit 303 triggered by generation of the second shutter switch signal SW2 and then writing of image data to a recording medium 325.

Operation members of the operation unit 317 are each assigned a function as appropriate for a scene with an operation of, for example, selecting a function icon from among various function icons displayed on the display unit 310, and each act as a button for the assigned function. Examples of the function buttons include a confirmation button, an end button, a return button, an image feed button, a jump button, a depth-of-field preview button, and an attribute change button. For example, in response to the menu button being pressed, a menu screen on which various settings are settable is displayed on the display unit 310. The user can intuitively perform various settings using the menu screen displayed on the display unit 310, a four-direction button, and a SET button.

A controller wheel 318 that is a rotatable operation member included in the operation unit 317 is used when a selection item is instructed, together with a direction button. The system control unit 308 controls the components of the imaging apparatus 101 based on a pulse signal.

The system control unit 308 can determine an angle at which the controller wheel 318 has been rotated, the number of rotations, and the like based on a pulse signal. The controller wheel 318 may be any operation member that can detect a rotation operation.

A controller ring 319 is a rotational operation member included in the operation unit 317, and is capable of being rotated around a lens barrel about an optical axis. For example, an operation on controller ring 319 generates an electrical pulse signal corresponding to an amount of rotation (amount of operation). The system control unit 308 controls the components of the imaging apparatus 101 based on the pulse signal. In response to a function switching button of the controller ring 319 included in the operation unit 317 being pressed, the display unit 310 displays a menu screen on which a function to be assigned to the controller ring 319 is changeable. The controller ring 319 and the controller wheel 318 are used for selecting a normal mode item and changing a value.

A power switch 320 is used for switching the power on and off.

A power supply control unit 321 includes a battery detection circuit, a direct current (DC)-to-DC converter, and a switch circuit that switches between blocks to be energized. The power supply control unit 321 detects whether a battery is attached, a type of battery, and a remaining battery level. The power supply control unit 321 controls the DC-to-DC converter based on a detection result and an instruction provided by the system control unit 308, and supplies an appropriate voltage to each component including the recording medium 325 for an appropriate period.

A power supply unit 322 includes a primary battery, such as an alkaline battery or a lithium battery, a secondary battery, such as a nickel-cadmium (Ni—Cd) battery, a nickel-metal hydride (NiMH) battery, or a lithium-ion (Li-ion) battery, an alternating current (AC) adapter, or the like.

A communication unit 323 transmits an image recorded in the recording medium 325 to an external device.

An I/F 324 is an interface with the recording medium 325. The recording medium 325 includes a semiconductor memory or a magnetic disk.

A network (NET) I/F 326 performs communication via a network under the control of the system control unit 308.

FIG. 3 is an example of a general imaging apparatus 101. The shutter 302, the mode changeover switch 314, the display unit 310, and other components may be excluded from the imaging apparatus 101.

Figure 4:
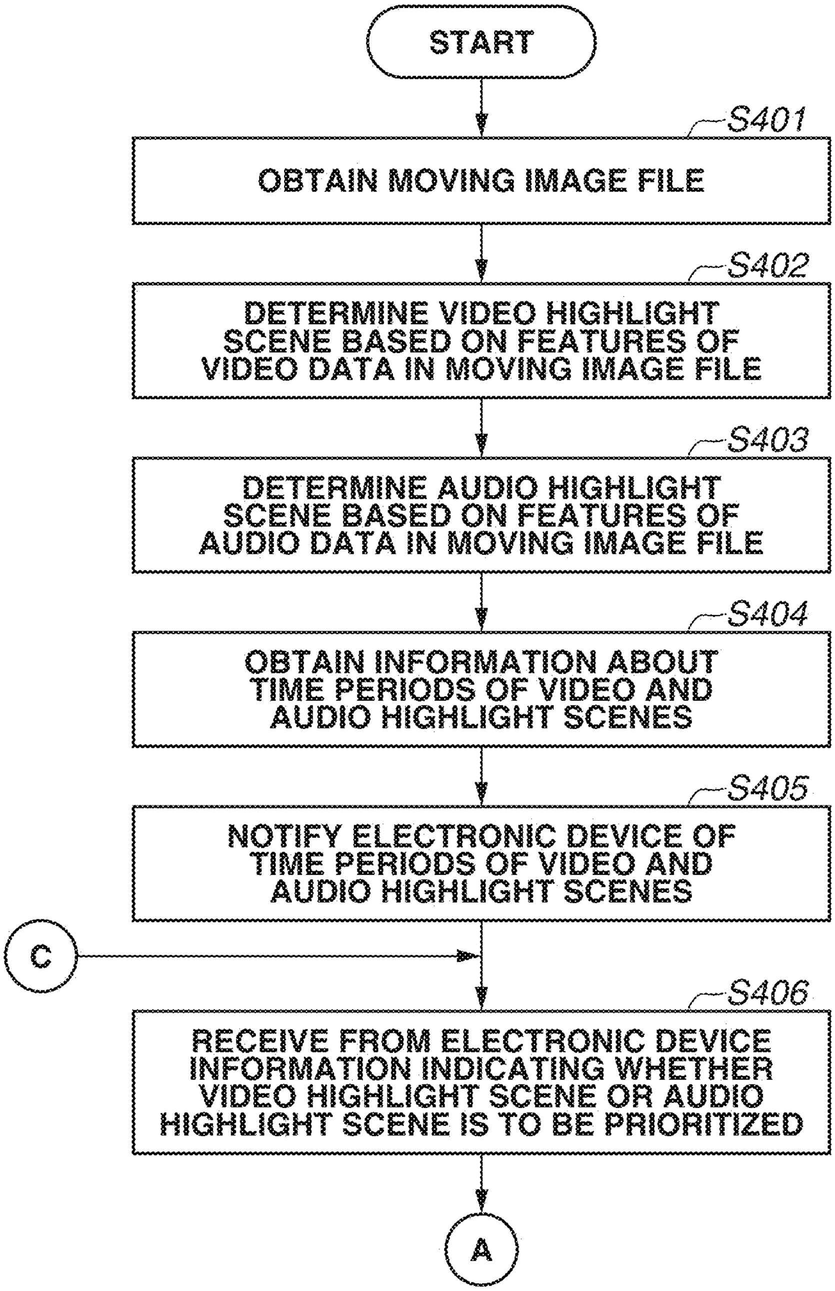
FIG. 4 is a flowchart illustrating processing in which the information processing apparatus generates a highlight moving image including a video highlight scene and an audio highlight scene.

FIGS. 4 to 7 are flowcharts illustrating processing for the information processing apparatus 103 to generate a highlight moving image including a video highlight scene and an audio highlight scene. FIG. 4 illustrates, in particular, processing until the information processing apparatus 103 receives, from the electronic device 102, a user's request that either a video highlight scene or an audio highlight scene is to be prioritized.

In step S401, the information processing apparatus 103 obtains a moving image file transmitted from the electronic device 102 of the user. As described above, the means for transmitting moving image files to the information processing apparatus 103 is not limited to a specific form.

In step S402, the information processing apparatus 103 extracts scene features from video data included in the moving image file that is to be processed, and compares the extracted features to determine a video highlight scene based on the features of the video data. For example, features of every frame image of video data are extracted and compared, so that a scene with a more vigorous motion than those in other scenes in a sport video is detected. As another example, features of a person's face in frame images are extracted and compared, so that a scene with a person in close-up is detected. In this way, a video highlight scene is determined. Here, the method of extracting and comparing features and the method of extracting a characterizing feature scene are not limited to specific methods.

In step S403, the information processing apparatus 103 performs audio recognition on audio data included in the moving image file, extracts audio features, and compares the extracted audio features to determine an audio highlight scene based on the features of the audio data. In the present exemplary embodiment, the information processing apparatus 103 detects a scene with characteristic sounds, such as a scene in which a musical instrument is being played, a scene in which spectators cheer, or a scene in which a person serving as a subject is talking, through extraction and comparison of audio features, and determines the detected scene to be an audio highlight scene.

In step S404, the information processing apparatus 103 obtains information about time periods of the video highlight scene and the audio highlight scene determined in step S402 and step S403. The time period of each highlight scene indicates the time period from the start time to the end time of the respective highlight scenes in a moving image file.

In step S405, the information processing apparatus 103 notifies the electronic device 102 of the time period of each highlight scene obtained in step S404. The user can check the information about the time period of each highlight scene notified to the electronic device 102, so that the user can select a highlight scene to be prioritized on their own while viewing the degree of overlap of highlight scenes. The method of the notification from the information processing apparatus 103 to the electronic device 102 is not limited to a specific method. The notification may be provided by display of the time periods on a screen of the electronic device 102 in a graphic user interface (GUI)-like manner, or may be provided by display of the time periods in a text file format or the like with associated time information described.

Figure 8:
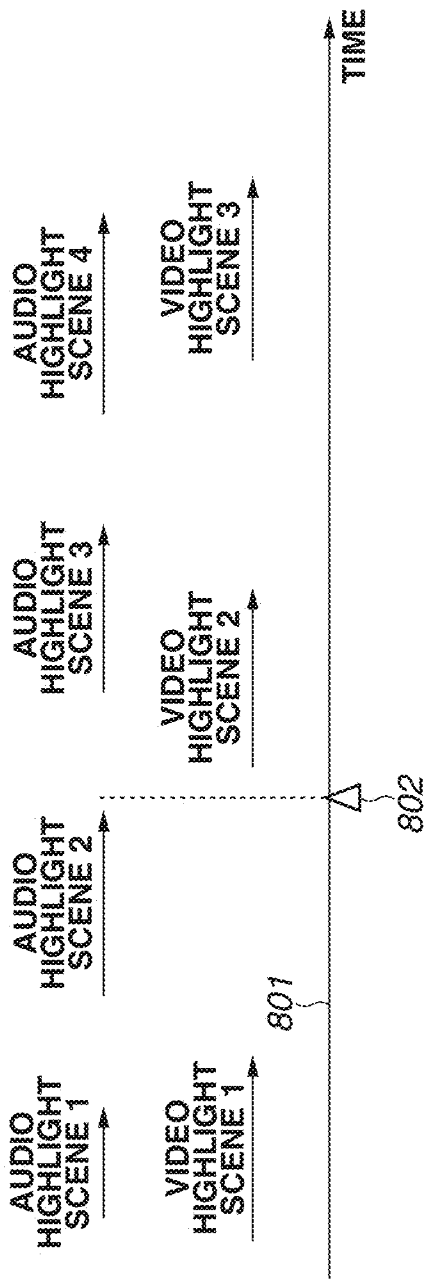
FIG. 8 is a display example for information about time periods of highlight scenes notified to the electronic device.

FIG. 8 is an example of information about the time period of each highlight scene that is notified to the electronic device 102 in step S405. In FIG. 8, a description will be provided of a form in which the information processing apparatus 103 notifies the electronic device 102 of the respective time periods and the electronic device 102 displays a GUI in accordance with the provided information.

The horizontal axis represents a time axis 801, and audio highlight scenes 1 to 4 and video highlight scenes 1 to 3 are highlight scenes determined in steps S402 and S403. In order to make the start time and the end time of each highlight scene clear, each time period from the start time to the end time is indicated by an arrow, and the position of each highlight scene on the time axis is indicated.

A seek bar 802 which is a standard seek bar such as one in music or moving image reproduction software, and is located on the time axis 801. The user operates the seek bar 802 to reproduce and display a moving image at a specific time, so that the user can check the moving image. Thus, the user can check the moving image corresponding to the time before and after the respective highlight scenes as well as the moving image corresponding to the time period of the respective highlight scenes.

In step S406, the information processing apparatus 103 receives from the electronic device 102 information indicating whether the video highlight scene or the audio highlight scene is to be prioritized. Here, the information processing apparatus 103 receives information indicating either the video highlight scene or the audio highlight scene is to be prioritized, or both the video highlight scene and the audio highlight scene are to be prioritized.

Examples in which the user prioritizes a video highlight scene include a case where the user wants to leave the moment in time when an airplane takes off at an airport, as a highlight moving image. More specifically, a video highlight scene to be extracted from features of motions of the airplane at the time of takeoff is to be prioritized over an audio highlight scene extracted from features of sounds, such as engine sounds and cheer before takeoff.

Examples in which the user prioritizes an audio highlight scene include a case where the user wants to leave a scene of a singer singing live, as a highlight moving image. More specifically, if a singer starts singing or a music performance starts while a stage is darkened, a subject in a video does not move, so that this scene is not extracted as a video highlight scene. For this reason, the audio highlight scene is to be prioritized.

[Highlight Moving Image Generation Processing in a Case where Video Highlight Scene and Audio Highlight Scene do not Overlap]

Figure 5:
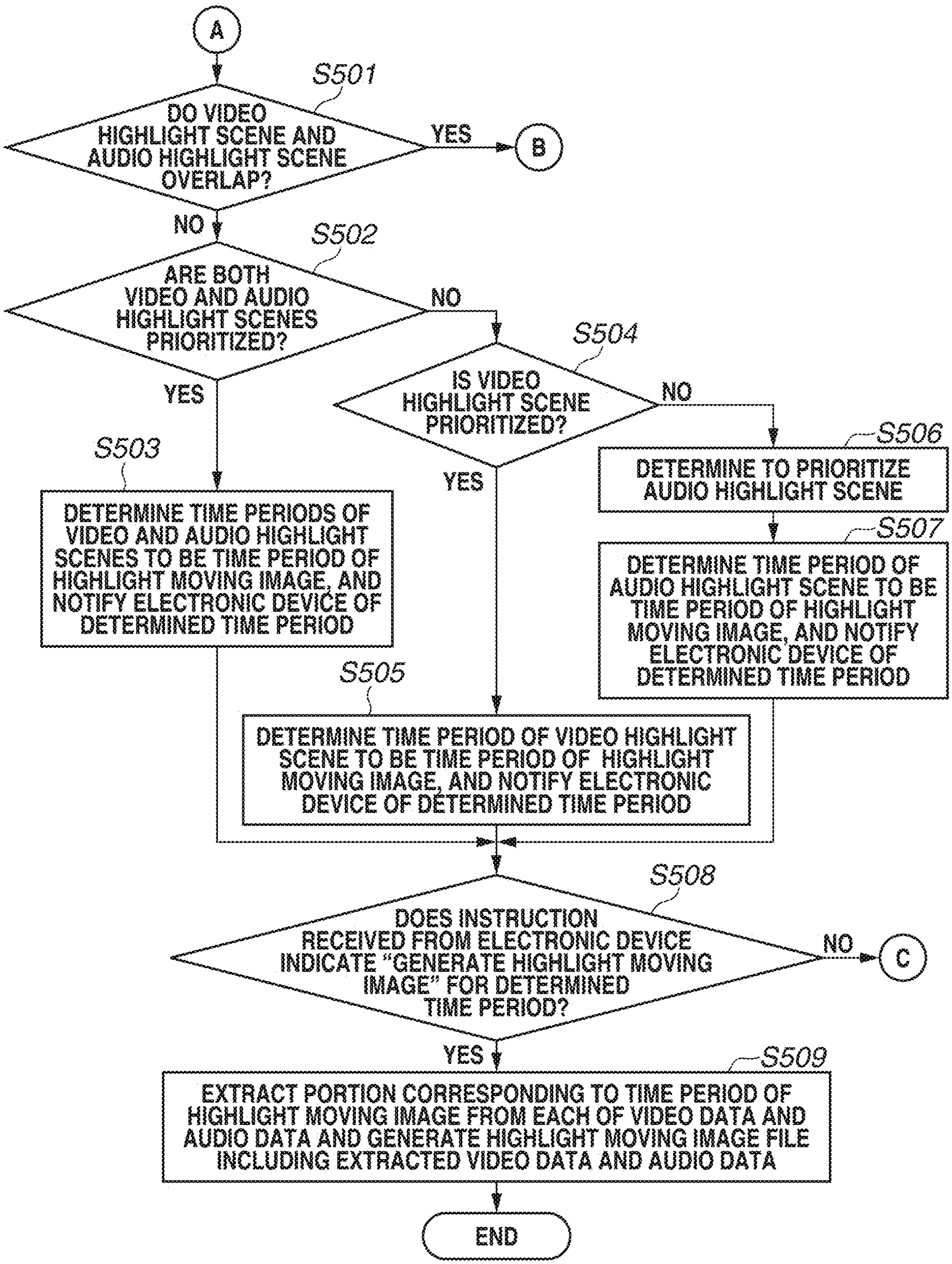
FIG. 5 is a flowchart illustrating processing in which the information processing apparatus generates the highlight moving image including the video highlight scene and the audio highlight scene.

The processing in a case where the information processing apparatus 103 determines, based on the time periods of the highlight scenes obtained in step S404, that the time period of the video highlight scene and the time period of the audio highlight scene do not overlap will be described with reference to the flowchart in FIG. 5.

In step S501, the information processing apparatus 103 determines whether the time period of the video highlight scene and the time period of the audio highlight scene overlap. If the information processing apparatus 103 determines that the time period of the video highlight scene and the time period of the audio highlight scene overlap (YES in step S501), the processing proceeds to step S601. If not (NO in step S501), the processing proceeds to step S502.

In step S502, the information processing apparatus 103 determines whether both the video highlight scene and the audio highlight scene are to be prioritized. If the information processing apparatus 103 determines that both the video highlight scene and the audio highlight scene are to be prioritized (YES in step S502), the processing proceeds to step S503. If not (NO in step S502), the processing proceeds to step S504.

In step S503, the information processing apparatus 103 determines the time periods of the video highlight scene and the audio highlight scene to be the time period of the highlight moving image, and notifies the electronic device 102 of the determined time period.

In step S504, the information processing apparatus 103 determines whether to prioritize the video highlight scene. If the information processing apparatus 103 determines that the video highlight scene is to be prioritized (YES in step S504), the processing proceeds to step S505. If not (NO in step S504), the processing proceeds to step S506.

In step S505, the information processing apparatus 103 determines the time period of the video highlight scene to be the time period of the highlight moving image, and notifies the electronic device 102 of the determined time period.

In step S506, the information processing apparatus 103 determines that the audio highlight scene is to be prioritized.

In step S507, the information processing apparatus 103 determines the time period of the audio highlight scene to be the time period of the highlight moving image, and notifies the electronic device 102 of the determined time period.

In step S508, the information processing apparatus 103 receives an instruction on whether to generate a highlight moving image for the determined time period from the electronic device 102, and if the received instruction indicates "do not generate a highlight moving image" (NO in step S508), the processing returns to the operation in step S406.

If the received instruction indicates "generate a highlight moving image" (YES in step S508), the processing proceeds to step S509. In step S509, the information processing apparatus 103 extracts a portion corresponding to the time period of highlight moving image from each of video data and audio data, and generates a highlight moving image file including the extracted portions of the video data and the audio data. The information processing apparatus 103 then records the generated highlight moving image file in the HDD 209, and ends the processing. Here, the generated highlight moving image file may be transmitted to the electronic device 102.

[Highlight Moving Image Generation Processing in a Case where Video and Audio Highlight Scenes Overlap and Both Video and Audio Highlight Scenes are to be Prioritized]

The processing in a case where the information processing apparatus 103 determines in step S501 that the time period of the video highlight scene and the time period of the audio highlight scene overlap will be described with reference to the flowchart in FIG. 6.

Figure 6:
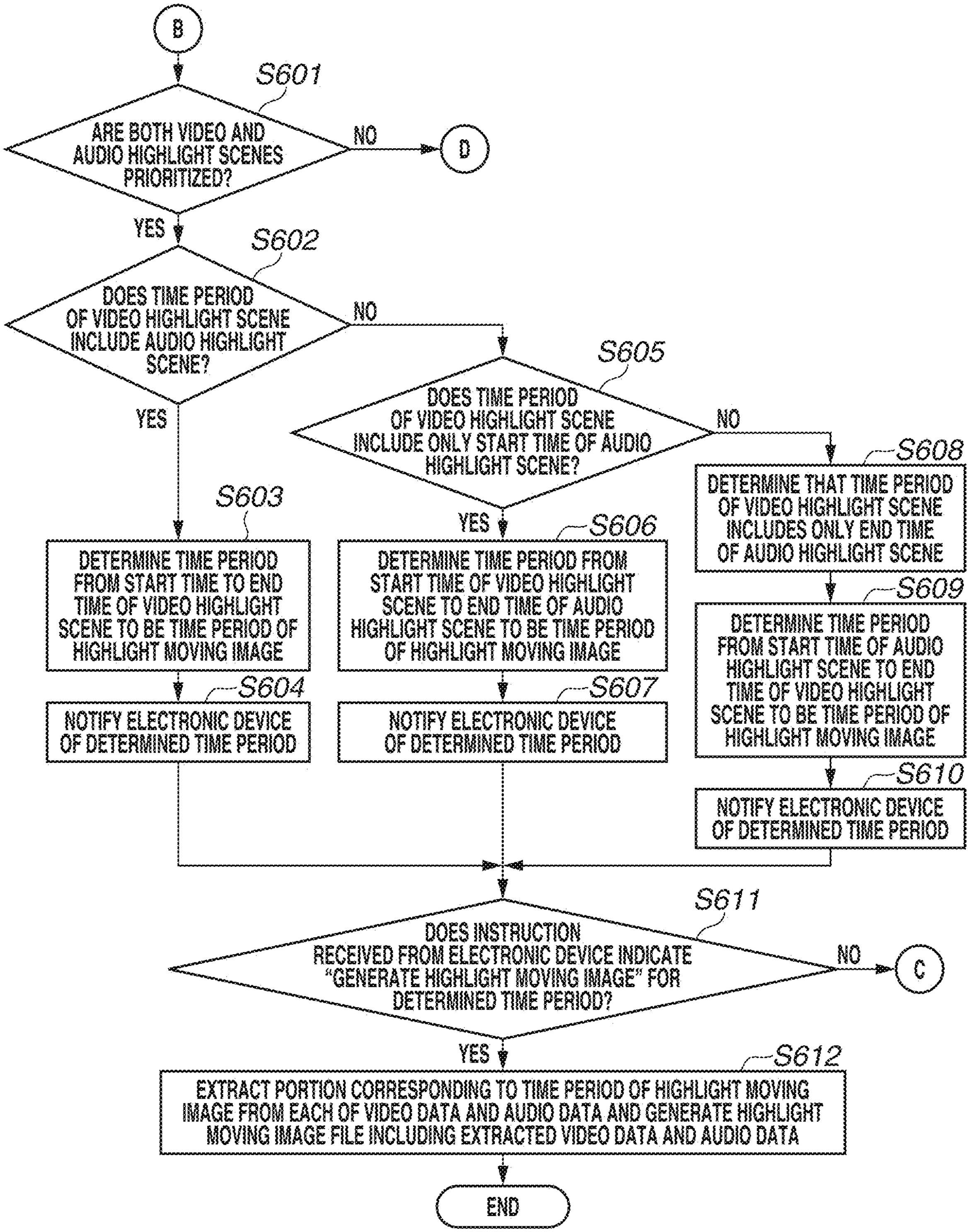
FIG. 6 is a flowchart illustrating processing in which the information processing apparatus generates the highlight moving image including the video highlight scene and the audio highlight scene.

FIG. 6 is a flowchart to be performed in a case where the time period of the video highlight scene and the time period of the audio highlight scene overlap, and both the video highlight scene and the audio highlight scene are to be prioritized.

In step S601, the information processing apparatus 103 determines whether both the video highlight scene and the audio highlight scene are to be prioritized. If the information processing apparatus 103 determines that both the video highlight scene and the audio highlight scene are to be prioritized (YES in step S601), the processing proceeds to step S602. If not (NO in step S601), the processing proceeds to step S701.

In step S602, the information processing apparatus 103 determines whether the time period of the video highlight scene includes the time period of the audio highlight scene. If the information processing apparatus 103 determines that the time period of the video highlight scene includes the time period of the audio highlight scene (YES in step S602), the processing proceeds to step S603. If not (NO in step S602), the processing proceeds to step S605.

In step S603, the information processing apparatus 103 determines the time period from the start time to the end time of the video highlight scene to be the time period of the highlight moving image. The processing then proceeds to step S604. In step S604, the information processing apparatus 103 notifies the electronic device 102 of the determined time period.

Figure 9:
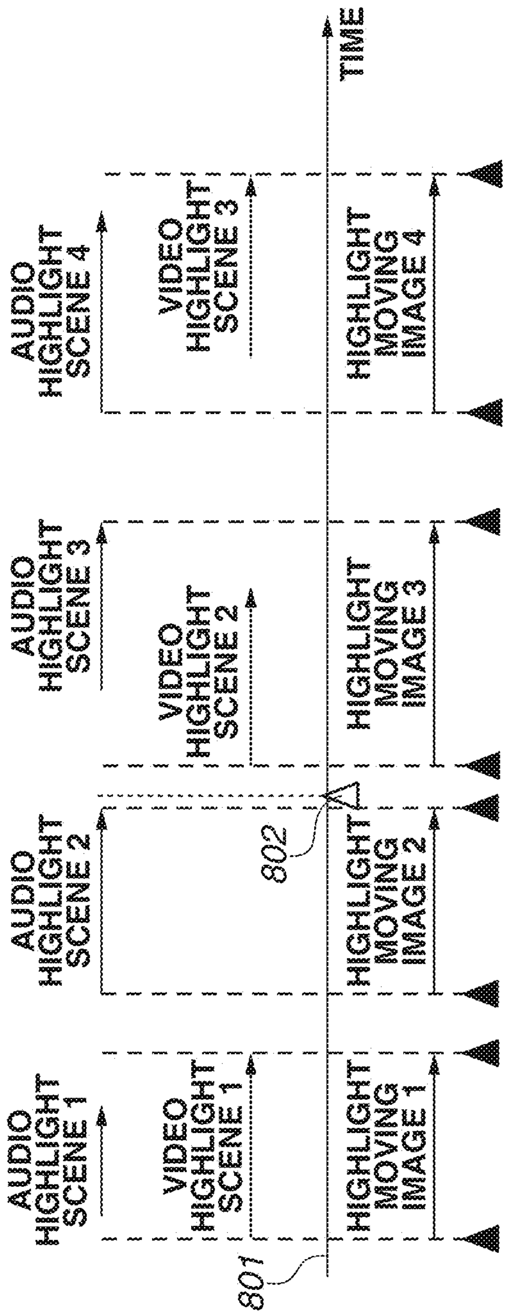
FIG. 9 is a display example for the information about time periods of highlight scenes notified to the electronic device.

Here, FIG. 9 illustrates an example of a display on the screen of the electronic device 102 in response to a notification of time periods of highlight moving images generated in a case where both video highlight scenes and audio highlight scenes are prioritized. In FIG. 9, the time period of the video highlight scene 1 includes the time period of the audio highlight scene 1. In such a case, the time period from the start time to the end time of the video highlight scene 1 is determined to be the time period of a highlight moving image 1. In step S604, the notification process may be omitted.

In step S605, the information processing apparatus 103 determines whether only the start time of the audio highlight scene is included in the time period of the video highlight scene. If the information processing apparatus 103 determines that only the start time of the audio highlight scene is included in the time period of the video highlight scene (YES in step S605), the processing proceeds to step S606. If not (NO in step S605), the processing proceeds to step S608.

In step S606, the information processing apparatus 103 determines the time period from the start time of the video highlight scene to the end time of the audio highlight scene to be the time period of the highlight moving image. In step S607, the information processing apparatus 103 notifies the electronic device 102 of the determined time period.

Providing this notification enables the user to check in advance whether a highlight moving image for a desired time period is generatable. In addition, the user can adjust the time period of the highlight moving image and change prioritization between the video highlight scene and the audio highlight scene on their own.

In FIG. 9, the time period of the video highlight scene 2 includes only the start time of the audio highlight scene 3. In this case, the time period from the start time of the video highlight scene 2 to the end time of the audio highlight scene 3 is determined to be the time period of a highlight moving image 3.

In step S608, the information processing apparatus 103 determines that the time period of the video highlight scene includes only the end time of the audio highlight scene.

In step S609, the information processing apparatus 103 determines the time period from the start time of the audio highlight scene to the end time of the video highlight scene to be the time period of the highlight moving image. In step S610, the information processing apparatus 103 notifies the electronic device 102 of the determined time period.

Providing this notification enables the user to check in advance whether a highlight moving image for a desired time period is generatable. In addition, the user can adjust the time period of the highlight moving image and change prioritization between the video highlight scene and the audio highlight scene on their own.

In FIG. 9, the time period of the video highlight scene 3 only includes the end time of the audio highlight scene 4. In such a case, the time period from the start time of the audio highlight scene 4 to the end time of the video highlight scene 3 is determined to be the time period of a highlight moving image 4.

In FIG. 9, the audio highlight scene 2 does not overlap any video highlight scenes 1 to 3. Since both the video highlight scene and the audio highlight scene are to be prioritized in this example, the time period of the audio highlight scene 2 is determined to be the time period of a highlight moving image 2.

In step S611, the information processing apparatus 103 receives an instruction on whether to generate a highlight moving image for the determined time period from the electronic device 102, and if the received instruction indicates "do not generate a highlight moving image" (NO in step S611), the processing returns to the operation in step S406.

If the received instruction indicates "generate a highlight moving image" (YES in step S611), the processing proceeds to step S612. In step S612, the information processing apparatus 103 extracts a portion corresponding to the time period of the highlight moving image from each of the video data and the audio data and generates a highlight moving image file including the extracted portions of the video data and the audio data. The information processing apparatus 103 records the generated highlight moving image file in the HDD 209, and ends the processing. The generated highlight moving image file may be transmitted to the electronic device 102.

[Highlight Moving Image Generation Processing in a Case where Video and Audio Highlight Scenes Overlap and Either Video or Audio Highlight Scene is to be Prioritized]

Figure 7:
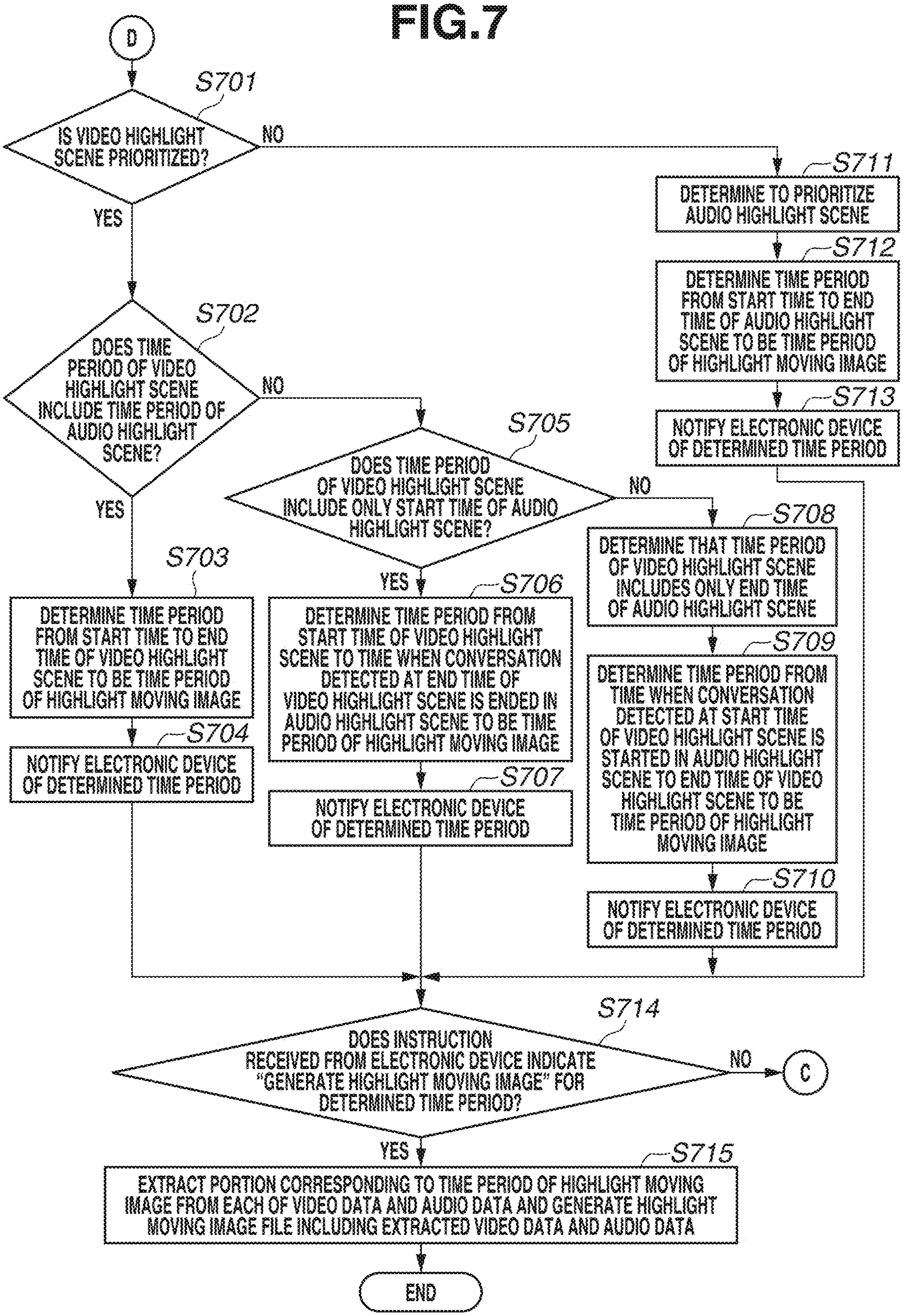
FIG. 7 is a flowchart illustrating processing in which the information processing apparatus generates the highlight moving image including the video highlight scene and the audio highlight scene.

The processing in the case where the information processing apparatus 103 determines in step S601 that not both the video highlight scene and the audio highlight scene are to be prioritized (either of them is to be prioritized) will be described with reference to the flowchart in FIG. 7.

In step S701, the information processing apparatus 103 determines whether the video highlight scene is to be prioritized. If the information processing apparatus 103 determines that the video highlight scene is to be prioritized (YES in step S701), the processing proceeds to step S702. If not (NO in step S701), the processing proceeds to step S711.

In step S702, the information processing apparatus 103 determines whether the time period of the video highlight scene includes the time period of the audio highlight scene. If the information processing apparatus 103 determines that the time period of the video highlight scene includes the time period of the audio highlight scene (YES in step S702), the processing proceeds to step S703. If not (NO in step S702), the processing proceeds to step S705.

In step S703, the information processing apparatus 103 determines the time period from the start time to the end time of the video highlight scene to be the time period of the highlight moving image. In step S704, the information processing apparatus 103 notifies the electronic device 102 of the determined time period.

Figure 10:
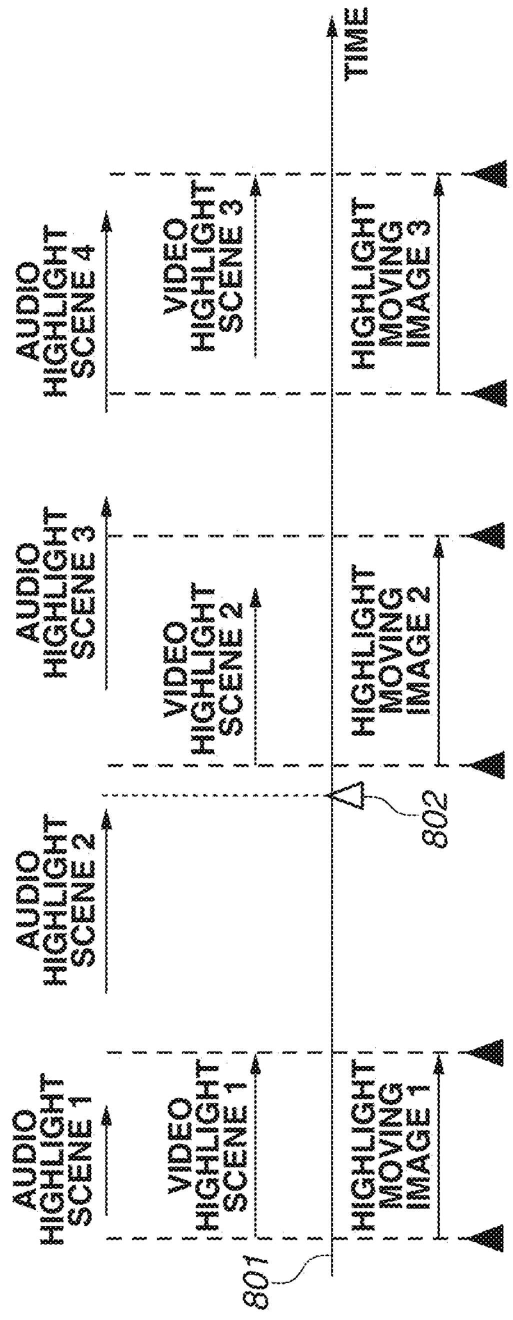
FIG. 10 is a display example for information about time periods of highlight scenes notified to the electronic device.

Here, FIG. 10 illustrates an example of displaying, on the screen of the electronic device 102, information about time periods of highlight moving images generated in a case where a video highlight scene is prioritized. In FIG. 10, the time period of the video highlight scene 1 includes the time period of the audio highlight scene 1. In this case, the time period from the start time to the end time of the video highlight scene 1 is determined to be the time period of the highlight moving image 1.

In step S705, the information processing apparatus 103 determines whether the time period of the video highlight scene includes only the start time of the audio highlight scene. If the information processing apparatus 103 determines that the time period of the video highlight scene includes only the start time of the audio highlight scene (YES in step S705), the processing proceeds to step S706. If not (NO in step S705), the processing proceeds to step S708.

In step S706, the information processing apparatus 103 determines the time period from the start time of the video highlight scene to time when a conversation detected at the end time of the video highlight scene is ended in the audio highlight scene to be the time period of the highlight moving image. In step S707, the information processing apparatus 103 notifies the electronic device 102 of the determined time period.

For example, ending reproduction of a highlight moving image during a conversation of a person in the highlight moving image is unnatural and not appropriate.

Thus, the information processing apparatus 103 determines the time period of the highlight moving image so that the time period of the highlight moving image includes a time period until when the conversation detected at the end time of the video highlight scene ends. For example, the time corresponding to the position of a full stop at which a conversation text detected at the end time of a video highlight scene ends is set to the end time of the highlight moving image. The positions of clauses and punctuation marks in conversational texts used here are extracted from conversational texts obtained by detecting conversations in audio data through the audio recognition performed in step S403 and converting the conversations into text data (conversational text).

Providing the notification in step S707 enables the user to check in advance whether a highlight moving image for a desired time period is generatable. In addition, the user can adjust the time period of the highlight moving image and change prioritization between the video highlight scene and the audio highlight scene on their own.

In FIG. 10, the time period of the video highlight scene 2 and the time period of the audio highlight scene 3 overlap, and the audio highlight scene 3 does not end even though the video highlight scene 2 ends. In this case, the information processing apparatus 103 determines the time period of the highlight moving image 2 so that the time period of the highlight moving image 2 includes a time period until when the conversation detected at the end time of the video highlight scene 2 ends.

In step S708, the information processing apparatus 103 determines that the time period of the video highlight scene includes only the end time of the audio highlight scene.

In step S709, the information processing apparatus 103 determines the time period from when a conversation detected at the start time of the video highlight scene starts in the audio highlight scene to the end time of the video highlight scene, to be the time period of the highlight moving image. In step S710, the information processing apparatus 103 notifies the electronic device 102 of the determined time period.

For example, starting reproduction of a highlight moving image during a conversation of a person in the highlight moving image is unnatural and not appropriate. Thus, the information processing apparatus 103 determines the time period from the time when the conversation detected at the start time of the video highlight scene starts to the end of the video highlight scene, to be the time period of the highlight moving image. For example, the time corresponding to the position of a full stop of a conversational text immediately before a conversational text detected at the start time of the video highlight scene is set to the start time of the highlight moving image.

The positions of clauses and punctuation marks in conversational texts used here are extracted from conversational texts obtained by detecting conversations in audio data through the audio recognition performed in step S403 and converting the conversations into text data (conversational texts).

Providing the notification in step S710 enables the user to check in advance whether a highlight moving image for a desired time period is generatable. In addition, the user can adjust the time period of the highlight moving image and change prioritization between the video highlight scene and the audio highlight scene on their own.

In FIG. 10, the time period of the video highlight scene 3 and the time period of the audio highlight scene 4 overlap, and the audio highlight scene 4 starts before the video highlight scene 3. In this case, the information processing apparatus 103 determines the time period from the time when the conversation detected at the start time of the video highlight scene 3 starts in the audio highlight scene 4 to the end time of the video highlight scene 3, to be the time period of the highlight moving image 3.

In step S711, the information processing apparatus 103 determines that the audio highlight scene is to be prioritized.

In step S712, the information processing apparatus 103 determines the time period from the start time to the end time of the audio highlight scene to be the time period of the highlight moving image. In step S713, the information processing apparatus 103 notifies the electronic device 102 of the determined time period. Providing this notification enables the user to check in advance whether a highlight moving image for a desired time period is generatable. In addition, the user can adjust the time period of the highlight moving image and change prioritization between the video highlight scene and the audio highlight scene on their own.

A dividing position, such as a full stop of a conversation or a music interlude, is clearly settable to an audio highlight scene. However, it is difficult to clearly set a dividing position to a video highlight scene because a subject in a video continuously moves. Thus, in a case where the audio highlight scene is to be prioritized, rather than setting the start and end positions of the video highlight scene in correspondence to the audio highlight scene, the information processing apparatus 103 determines a time period with only the audio highlight scene reflected to be the time period of the highlight moving image in the present exemplary embodiment.

However, there is a possibility that a highlight moving image desired by the user is not generated. Thus, the information processing apparatus 103 previously notifies the user of a time period with only an audio highlight scene reflected to enable the user to adjust the time period by themselves.

In a case where an audio highlight scene is to be prioritized, the processing in FIG. 6 may be performed as in a case where both the video highlight scene and the audio highlight scene are to be prioritized.

In step S714, the information processing apparatus 103 receives, from the electronic device 102, an instruction on whether to generate a highlight moving image for the determined time period. If the received instruction indicates "do not generate a highlight moving image" (NO in step S714), the processing returns to the operation in step S406.

If the received instruction indicates "generate a highlight moving image" (YES in step S714), the processing proceeds to step S715. In step S715, the information processing apparatus 103 extracts a portion corresponding to the time period of the highlight moving image from each of the video data and the audio data and generates a highlight moving image file including the extracted portions of the video data and the audio data. The information processing apparatus 103 records the generated highlight moving image file in the HDD 209, and ends the processing. The generated highlight moving image file may be transmitted to the electronic device 102.

In the present exemplary embodiment, a schematic diagram is displayed on the electronic device 102 as a notification method for information about time periods. The notification method is however not limited to this example, and a form in which texts are displayed is also possible.

Possible examples of other forms include display of a moving image obtained by joining together highlight moving images that are recorded in the present exemplary embodiment, on the screen of the electronic device 102.

As another possible form, a generated highlight moving image is output to the electronic device 102 as a moving image file.

Furthermore, editing such that switching between a video highlight scene and an audio highlight scene is recognizable in consideration of a degree of overlap between the video highlight scene and the audio highlight scene based on information about the time period of the video highlight scene and the time period of the audio highlight scene is applicable.

It is also possible to notify the user of the edit. For example, in a case where a video highlight scene starts in the middle of an audio highlight scene, the user is notified of a method of applying an audio transition such that audio fades out.

In a case where features of scenes in joined video highlight scenes are greatly different, a video transition may be applied to a joint.

Other Embodiments

According to the present disclosure, either a video highlight scene or an audio highlight scene or both is prioritized in accordance with details of content, so that an appropriate highlight moving image suitable for the details of the content is generated.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-138004, filed Aug. 28, 2023, which is hereby incorporated by reference herein in its entirety.

What is claimed is:

1. An information processing apparatus capable of communicating with an electronic device, the information processing apparatus comprising:

one or more memories; and one or more processors in communication with the one or more memories, wherein the one or more processors and the one or more memories are configured to:

determine a video highlight scene based on a feature of video data included in a moving image file, and determine an audio highlight scene based on a feature of audio data included in the moving image file;

obtain information about a time period of each of the video highlight scene and the audio highlight scene;

receive priority information from the electronic device, the priority information indicating whether either the video highlight scene or the audio highlight scene or both are to be prioritized;

determine a time period of a highlight moving image based on the priority information and information about the time period of each of the video highlight scene and the audio highlight scene; and determine whether to provide a notification of the time period of the highlight moving image to the electronic device, wherein, in a case where the time period of the video highlight scene and the time period of the audio highlight scene overlap, the received priority information indicates that the video highlight scene is to be prioritized, and the time period of the video highlight scene includes the time period of the audio highlight scene, the one or more processors and the one or more memories determine the time period of the video highlight scene to be the time period of the highlight moving image, and do not provide the notification, and wherein, in a case where the time period of the video highlight scene and the time period of the audio highlight scene overlap, the received priority information indicates that the video highlight scene is to be prioritized, and the time period of the video highlight scene does not include the time period of the audio highlight scene, the one or more processors and the one or more memories provide the notification.

2. The information processing apparatus according to claim 1, wherein, in a case where the time period of the video highlight scene and the time period of the audio highlight scene do not overlap and the received priority information indicates that both the video highlight scene and the audio highlight scene are to be prioritized, the one or more processors and the one or more memories determine the time period of each of the video highlight scene and the audio highlight scene to be the time period of the highlight moving image.

3. The information processing apparatus according to claim 1, wherein, in a case where the time period of the video highlight scene and the time period of the audio highlight scene do not overlap and the received priority information indicates that either the video highlight scene or the audio highlight scene is to be prioritized, the one or more processors and the one or more memories determine, to be the time period of the highlight moving image, either one of the time periods of the video highlight scene and the audio highlight scene, whichever is to be prioritized.

4. The information processing apparatus according to claim 1, wherein, in a case where the time period of the video highlight scene and the time period of the audio highlight scene overlap, the received priority information indicates that both the video highlight scene and the audio highlight scene are to be prioritized, and the time period of the video highlight scene includes the time period of the audio highlight scene, the one or more processors and the one or more memories determine the time period of the video highlight scene to be the time period of the highlight moving image.

5. The information processing apparatus according to claim 1, wherein, in a case where the time period of the video highlight scene and the time period of the audio highlight scene overlap, the received priority information indicates that both the video highlight scene and the audio highlight scene are to be prioritized, and the time period of the video highlight scene includes only a start time of the audio highlight scene, the one or more processors and the one or more memories determine a time period from a start time of the video highlight scene to an end time of the audio highlight scene to be the time period of the highlight moving image.

6. The information processing apparatus according to claim 1, wherein, in a case where the time period of the video highlight scene and the time period of the audio highlight scene overlap, the received priority information indicates that both the video highlight scene and the audio highlight scene are to be prioritized, and the time period of the video highlight scene includes only an end time of the audio highlight scene, the one or more processors and the one or more memories determine a time period from a start time of the audio highlight scene to an end time of the video highlight scene to be the time period of the highlight moving image.

7. The information processing apparatus according to claim 1, wherein the one or more processors and the one or more memories are further configured to detect a conversation from the audio highlight scene, and wherein, in a case where the time period of the video highlight scene and the time period of the audio highlight scene overlap, the received priority information indicates that the video highlight scene is to be prioritized, and the time period of the video highlight scene includes only a start time of the audio highlight scene, the one or more processors and the one or more memories determine, to be the time period of the highlight moving image, a time period from a start time of the video highlight scene to a time when a conversation detected at an end time of the video highlight scene ends in the audio highlight scene.

8. The information processing apparatus according to claim 1, wherein the one or more processors and the one or more memories are further configured to detect a conversation from the audio highlight scene, and wherein, in a case where the time period of the video highlight scene and the time period of the audio highlight scene overlap, the received priority information indicates that the video highlight scene is to be prioritized, and the time period of the video highlight scene includes only an end time of the audio highlight scene, the one or more processors and the one or more memories determine, to be the time period of the highlight moving image, a time period from a time when a conversation detected at a start time of the video highlight scene starts in the audio highlight scene to an end time of the video highlight scene.

9. The information processing apparatus according to claim 1, wherein, in a case where the time period of the video highlight scene and the time period of the audio highlight scene overlap, and the received priority information indicates that the audio highlight scene is to be prioritized, the one or more processors and the one or more memories determine the time period of the audio highlight scene to be the time period of the highlight moving image.

10. The information processing apparatus according to claim 1, wherein the one or more processors and the one or more memories are further configured to receive an instruction on whether to generate a-the highlight moving image from the electronic device, and wherein, in a case where the received instruction indicates that the highlight moving image is to be generated, the one or more processors and the one or more memories extract a portion corresponding to the time period of the highlight moving image from each of the video data and the audio data and generate a highlight moving image file.

11. The information processing apparatus according to claim 1, wherein the one or more processors and the one or more memories are further configured to notify the electronic device of the time period of each of the video highlight scene and the audio highlight scene.

12. A method for controlling an information processing apparatus capable of communicating with an electronic device, the method comprising:

performing first determination in which a video highlight scene is determined based on a feature of video data included in a moving image file and an audio highlight scene is determined based on a feature of audio data included in the moving image file;

obtaining information about a time period of each of the video highlight scene and the audio highlight scene determined through the first determination;

receiving priority information from the electronic device, the priority information indicating whether either the video highlight scene or the audio highlight scene or both are to be prioritized;

performing second determination in which a time period of a highlight moving image is determined based on the received priority information and information about the time period of each of the video highlight scene and the audio highlight scene; and determining whether to provide a notification of the time period of the highlight moving image to the electronic device, wherein, in a case where the time period of the video highlight scene and the time period of the audio highlight scene overlap, the received priority information indicates that the video highlight scene is to be prioritized, and the time period of the video highlight scene includes the time period of the audio highlight scene, the one or more processors and the one or more memories determine the time period of the video highlight scene to be the time period of the highlight moving image, and do not provide the notification, and wherein, in a case where the time period of the video highlight scene and the time period of the audio highlight scene overlap, the received priority information indicates that the video highlight scene is to be prioritized, and the time period of the video highlight scene does not include the time period of the audio highlight scene, the one or more processors and the one or more memories provide the notification.

13. A non-transitory computer-readable storage medium storing a program for causing a computer to perform the method for controlling the information processing apparatus according to claim 12.

14. An information processing system including an electronic device and an information processing apparatus capable of communicating with the electronic device, wherein the information processing apparatus comprises:

one or more memories; and one or more processors in communication with the one or more memories, wherein the one or more processors and the one or more memories are configured to:

determine a video highlight scene based on a feature of video data included in a moving image file, and determine an audio highlight scene based on a feature of audio data included in the moving image file;

obtain information about a time period of each of the video highlight scene and the audio highlight scene;

receive priority information from the electronic device, the priority information indicating whether either the video highlight scene or the audio highlight scene or both are to be prioritized;

determine a time period of a highlight moving image based on the priority information and information about the time period of each of the video highlight scene and the audio highlight scene; and determine whether to provide a notification of the time period of the highlight moving image to the electronic device, wherein, in a case where the time period of the video highlight scene and the time period of the audio highlight scene overlap, the received priority information indicates that the video highlight scene is to be prioritized, and the time period of the video highlight scene includes the time period of the audio highlight scene, the one or more processors and the one or more memories determine the time period of the video highlight scene to be the time period of the highlight moving image, and do not provide the notification, and wherein, in a case where the time period of the video highlight scene and the time period of the audio highlight scene overlap, the received priority information indicates that the video highlight scene is to be prioritized, and the time period of the video highlight scene does not include the time period of the audio highlight scene, the one or more processors and the one or more memories provide the notification.

* * * * *